(12) United States Patent
Schober et al.

(10) Patent No.: US 6,592,178 B2
(45) Date of Patent: Jul. 15, 2003

(54) OPENABLE MOTOR VEHICLE ROOF AND PROCESS FOR ITS OPERATION

(75) Inventors: Stefan Schober, Heilbronn (DE); Josef Appel, Gauting (DE); Ferdinand Hahn, Diessen (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/024,532

(22) Filed: Dec. 21, 2001

(65) Prior Publication Data

US 2002/0101098 A1 Aug. 1, 2002

(30) Foreign Application Priority Data

Dec. 22, 2000 (DE) .......................... 100 64 702

(51) Int. Cl.⁷ ................................ B60J 7/057
(52) U.S. Cl. ..................... 296/214; 296/223; 180/271; 280/748
(58) Field of Search ................. 296/214, 223; 180/271; 280/748

(56) References Cited

U.S. PATENT DOCUMENTS

| | | | |
|---|---|---|---|
| 4,331,359 A | | 5/1982 | Sheldon |
| 5,147,107 A | * | 9/1992 | Yamauchi et al. .......... 296/214 |
| 5,250,882 A | * | 10/1993 | Odoi et al. ............. 296/223 X |
| 5,372,401 A | | 12/1994 | Odoi et al. |

FOREIGN PATENT DOCUMENTS

| | | |
|---|---|---|
| DE | 37 31 428 | 4/1989 |
| DE | 40 28 584 | 11/1991 |
| DE | 42 21 043 A1 | 1/1993 |
| DE | 195 13 971 | 10/1995 |
| DE | 195 07 541 | 2/1996 |
| DE | 195 35 796 | 3/1996 |
| DE | 39 29 986 | 11/1997 |
| DE | 196 18 219 | 11/1997 |
| DE | 196 39 867 | 4/1998 |
| DE | 196 33 811 | 2/2000 |
| DE | 198 40 161 | 3/2000 |
| DE | 198 40 162 | 3/2000 |
| DE | 198 40 163 | 3/2000 |
| DE | 198 40 164 | 3/2000 |

* cited by examiner

Primary Examiner—Dennis H. Pedder
(74) Attorney, Agent, or Firm—Nixon Peabody LLP; David S. Safran

(57) ABSTRACT

An openable motor vehicle roof including a closing element adapted for movement into a position that closes or at least partially clears an opening in a fixed roof skin of the motor vehicle, and a cover element adapted to be positioned underneath the roof opening for movement into a position that conceals or at least partially clears the closing element or the roof opening with respect to an interior area of the motor vehicle. At least one drive mechanism is provided for selectively and adjustably moving the closing element and the closing mechanism. Also provided is a controller for controlling the drive mechanism, the controller adapted to control the drive mechanism such that movement of the closing element into a closed position is not initiated until the cover element is moved at least into a position which covers an area of the roof opening that is not covered by the closing mechanism. In this way, entry of objects from the interior area of the motor vehicle into the area of the roof opening that is not covered by said closing element is prevented.

14 Claims, 7 Drawing Sheets

OPENABLE MOTOR VEHICLE ROOF AND PROCESS FOR ITS OPERATION

BACKGROUND OF THE INVENTION

1. Field of the Invention

This invention relates to an openable motor vehicle roof with a closing element which can be adjusted by a drive in a fixed roof skin for selectively closing or at least partially clearing an opening in the roof, and a process for operating one such motor vehicle roof.

2. Description of the Related Art

A motor vehicle roof of the general type to which the invention is directed is known, for example, from published German Patent Application DE 198 33 811 A1, in which a closing element is provided for a cover of a sliding and lifting roof, the cover element comprising a movable roof headliner. In an area of the front edge of the roof opening is a pressure sensor located roughly in a plane in which the sliding headliner moves, or slightly above it. In this way, the pressure sensor can detect both pinching of an article or body part between the front edge of the cover and the sensor and also between the front edge of the sliding headliner and the sensor. In this way, pinching of an article or body part by the sliding headliner is prevented.

Accomplishing pinch protection for the adjustable cover of an openable motor vehicle roof by way of pinching sensors which are attached to the front edge of the cover or the front edge of the roof opening, and which can be made, for example, as piezoelectric pressure sensors or optical fibers, is generally known, see published German Patent Applications DE 37 31 428 A2 and DE 195 35 796 A1. Since these pressure sensors must be placed over the entire width of the roof opening or of the cover to accomplish effective pinch protection, especially in the form of sensor strips, this pinch protection is very complex. If, on the other hand, for reasons of cost, the number or extension of the sensors is reduced, pinch protection is no longer completely effective.

Furthermore, accomplishing pinch protection for adjustable covers of an openable motor vehicle roof by monitoring the operating parameters of the cover drive motor is known. In this case, the motor current and its change over time, or the torque of the drive motor or its change, and the rpm or rpm change of the motor can be monitored. Examples here are publish German Patent Applications DE 198 40 161 A1; DE 198 40 162 A1; DE 198 40 163 A1; DE 198 40 164 A1; and DE 196 18 219 A1, and German Patents DE 39 29 986 C2, and DE 195 07 541 C1. These processes are also called "indirect" processes. The problem with indirect processes is that the generally highly nonlinear kinematics of the cover makes it difficult to detect pinching processes up to the point of impossibility, so that the reliability of these processes is frequently poor, at least under certain operating conditions.

SUMMARY OF THE INVENTION

A primary object of this invention is to devise a motor vehicle roof with an adjustable closing element and an adjustable cover element and a process for its operation, with which pinch protection as comprehensive and reliable as possible is obtained in as simple and economical a manner as possible.

This object is achieved in accordance with the invention by a motor vehicle roof with a closing element which is adjustable by a drive for selectively closing or at least partially clearing an opening in a fixed roof skin. The motor vehicle roof includes a cover element located underneath the roof opening and the closing mechanism, the cover element being adjustable by way of a drive in order to conceal or at least partially clear the closing element or the roof opening with respect to the motor vehicle interior. In accordance with the invention, respective drives for the closing element and the cover element are in electronic communication with a controller such that before the start of any movement of the closing element which could result in pinching of body parts or articles between the closing element and an edge of the roof opening edge, the cover element is positioned such that an area of the roof opening which is not covered by the closing element is covered by the cover element at least to a position so that body parts or articles cannot extend into that area which is not covered by the closing mechanism.

This object is also achieved in accordance with the invention by a process for operating an openable motor vehicle roof including steps of providing a closing element which is adjustable by a drive for selectively closing or at least partially clearing an opening in a fixed roof skin, providing a cover element located underneath the roof opening and the closing mechanism, the cover element being adjustable by way of a drive in order to conceal or at least partially clear the closing element or the roof opening with respect to the motor vehicle interior, providing a controller for controller operation of the drives for the closing element and the cover element such that before the start of any movement of the closing element which could result in pinching of body parts or articles between the closing element and an edge of the roof opening edge, the cover element is positioned such that an area of the roof opening which is not covered by the closing element is covered by the cover element at least to a position so that body parts or articles cannot extend into that area which is not covered by the closing mechanism.

In these approaches, it is advantageous that separate pinch protection for the closing element is eliminated since by corresponding control of the cover mechanism, it is always ensured that intentional movement of the closing element cannot lead to pinching of body parts between the closing element and the roof opening edge. The important advantage is that the demands on the closing motion of the closing element are generally very different from the demands on the closing motion of the cover mechanism. For instance, on one hand, for the closing element a much higher closing force is necessary to enable tight closing of the roof opening, while on the other hand, the kinematics of the motion of the closing element generally is much more dramatically nonlinear than the kinematics of the motion of the cover mechanism. As a result of the smaller closing force, under certain circumstances, pinch protection can be abandoned for the cover mechanism. However, if pinch protection for the cover element is necessary, it can be reliably accomplished by way of a so-called indirect process in which, for example, the current of the drive motor or the rpm of the drive motor is monitored. As a result, since the much more dramatically linear kinematics of the motion of the cover mechanism, these processes work reliably here and a complex sensor strip on the cover element or on the edge of the roof opening is not necessary.

DETAILED DESCRIPTION OF THE INVENTION

Figure 1:
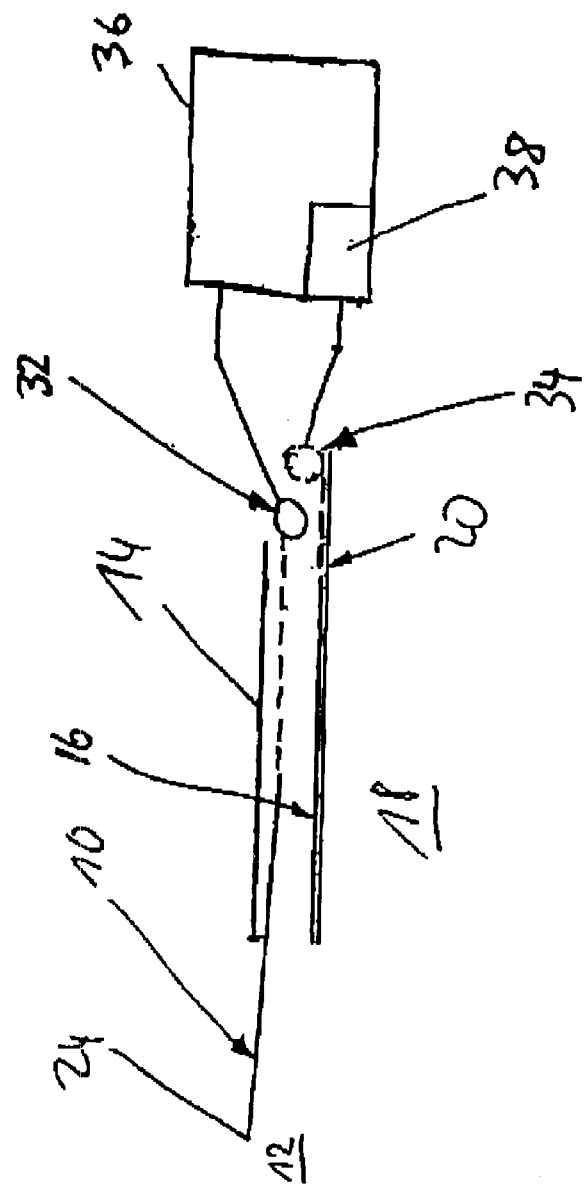
FIG. 1 schematically shows a side view of a motor vehicle roof in accordance with the invention in a first position.
Figure 1:
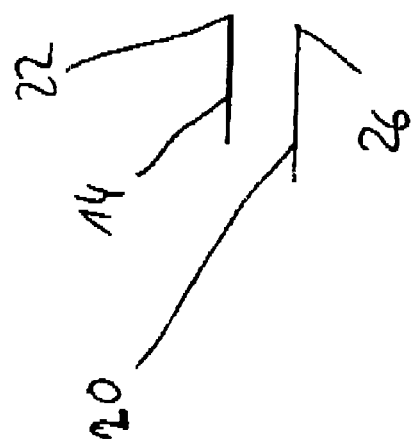
Figure 3:
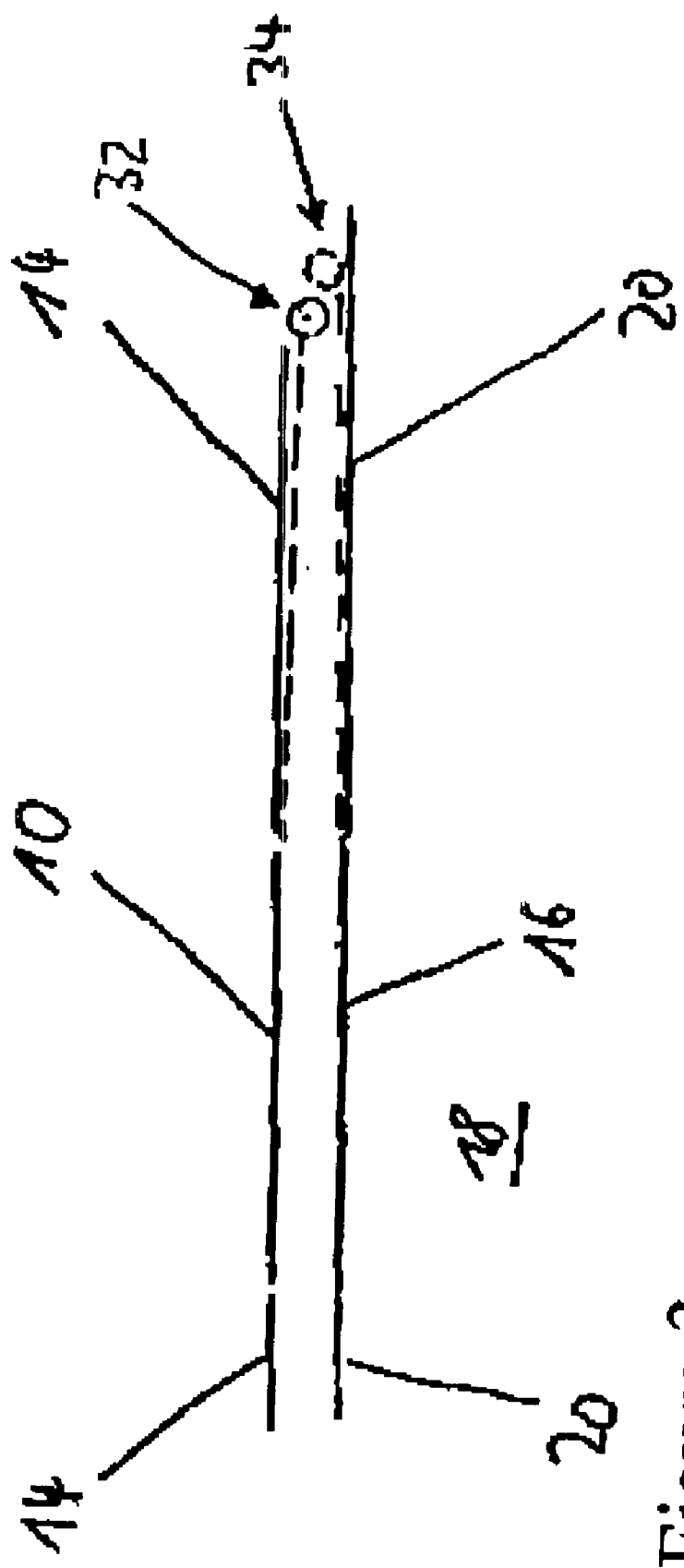
Figure 6:
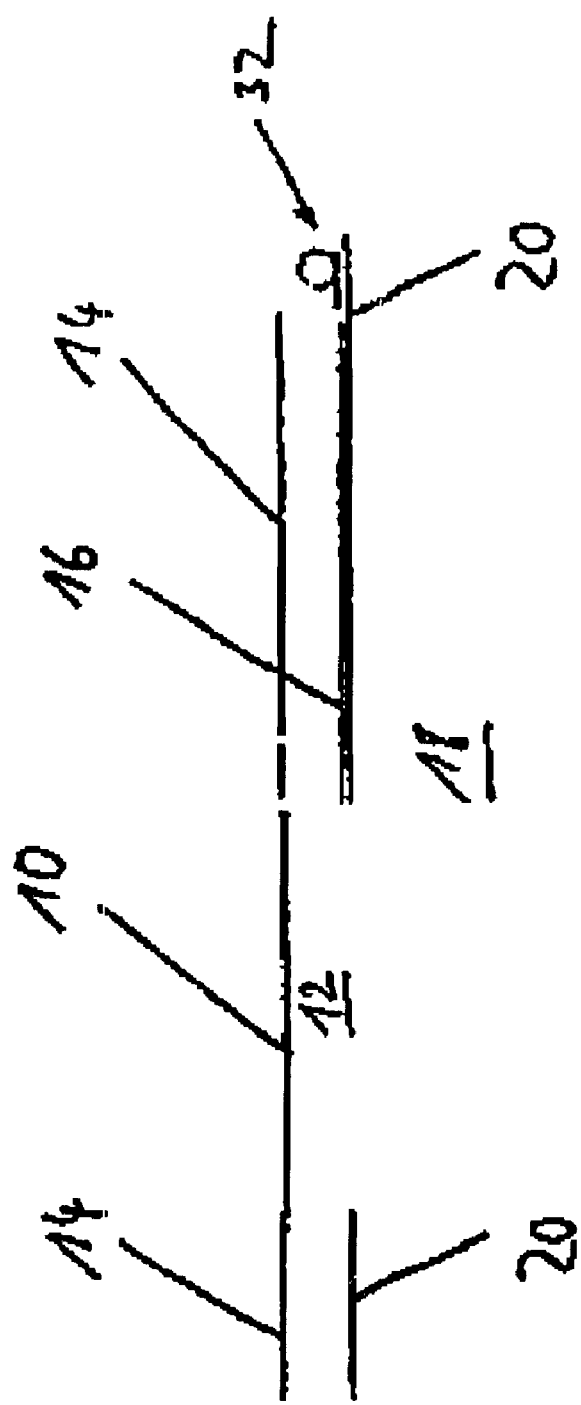

FIG. 1 shows a sliding and lifting roof including a cover 10 for closing or at least partially clearing a roof opening 12 in a fixed roof skin 14. The cover 10 is shown in a position in which it is positioned roughly halfway to the rear and underneath the fixed roof skin 14, and thus, halfway clears the roof opening 12 (sliding roof function). The cover 10 is made transparent to allow light to be incident through it when placed in a closed state, as shown in FIGS. 3 & 6. A sliding headliner 16 is provided which acts as a sunshade in order to selectively cover or at least partially clear the opening 12, or with the cover 10 in the closed position, to hide the cover 10 with respect to the motor vehicle interior 18.

Outside the roof opening 12, yet underneath the fixed roof skin 14, is a fixed headliner 20 for concealing the fixed roof skin 14 with respect to the interior 18. As shown in FIG. 1, in order to enable unhindered light incidence and unhindered air flow, the sliding headliner 16 is placed in a position in which the headliner 16 is pushed completely to the rear over the fixed head lining 20 in order to completely clear the roof opening 12, the cover 10 partially projecting into the opening 12.

The cover 10 is driven in a known manner by a drive 32 (shown schematically with broken lines) which may comprise an electric motor, a pinion driven by the motor, and two compressively-stiff drive cables driven by the pinion rack. The sliding headliner 16 can similarly be driven by a separate drive 34 comprising the same elements. Accordingly, the motors of the cover 10 and the headliner 16 are controlled preferably by a digital controller 36 programmed to prevent pinching of body parts or articles caught between the front roof opening edge 22 and the front edge 24 of the cover. This is accomplished such that before the start of any movement of the cover 10 which could lead to pinching of body parts or articles caught between the front roof opening edge 22 and the front edge 24 of the cover, the sliding headliner 16 is positioned such that an area of the roof opening 12 not covered by the cover 10 is concealed by the sliding headliner 16. The area of the opening 12 is concealed to such an extent that it is not accessible from the interior 18, and before closing of the cover 10, body parts or articles cannot end up in the area of the roof opening 12 which is not covered at the time by the cover 10.

Figure 2:
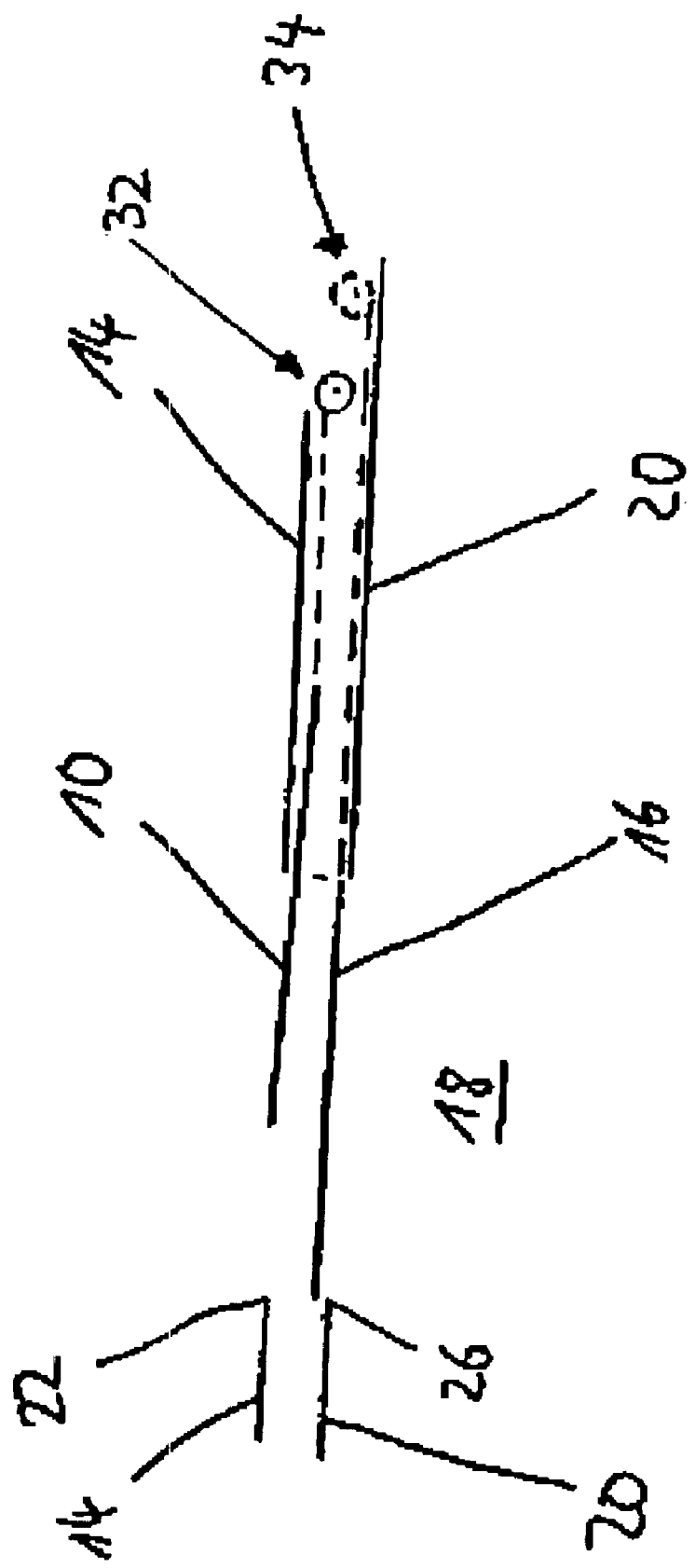
FIGS. 2 through 6 each show a side view of the motor vehicle roof of FIG. 1 in a respective different position of the adjustable roof mechanisms.

Accordingly, an operator may move the cover 10 out of an intermediate position (FIG. 1) into a closed position (FIG. 3) by actuating a corresponding controller 36 for the drive 32 of the cover 10. In doing so, the closing motion of the cover 10 is delayed until the sliding headliner 16 has been moved into the position shown in FIG. 2 in which it completely covers from underneath the part of the roof opening 12 which is not covered by the cover 10. In this way, articles or body parts cannot end up in the open area of the roof opening 12 from the interior of the motor vehicle.

In this example, the sliding headliner 16 completely covers the roof opening 12. The control of the sliding headliner 16 is made such that the passage from the position shown in FIG. 1 into the position shown in FIG. 2 takes place automatically by the actuation of the digital controller 36 for the cover 10 when closing the cover 10. Only when the sliding headliner 16 has reached the position shown in FIG. 2 does control begin with the closing of the cover 10, which can safely occur at that time without the possibility of pinching an article or body part. In this way, pinch protection for the cover 10, by providing sensor strips on the front cover edge 24 or the front roof opening edge 22 can be abandoned.

Depending, however, upon the closing force of the sliding headliner 16, it can be necessary or advantageous to provide the sliding headliner 16 with pinch protection in order to prevent pinching of an article or body part between the front edge 26 of the fixed headliner and the front roof opening edge 22. As a result of the relatively high linearity of the kinematics of the sliding headliner 16, this pinch protection can, however, be reliably implemented by a so-called indirect process. Under this circumstance, at least one operating parameter of the drive motor for the sliding headliner 16 is monitored by a sensing mechanism 38, for example, the motor current and/or the motor speed or their changes over time. These processes are known for monitoring roof covers but, due to the often high nonlinearity of the cover kinematics for monitoring of the roof covers, do not offer reliable pinch protection.

Figure 4:
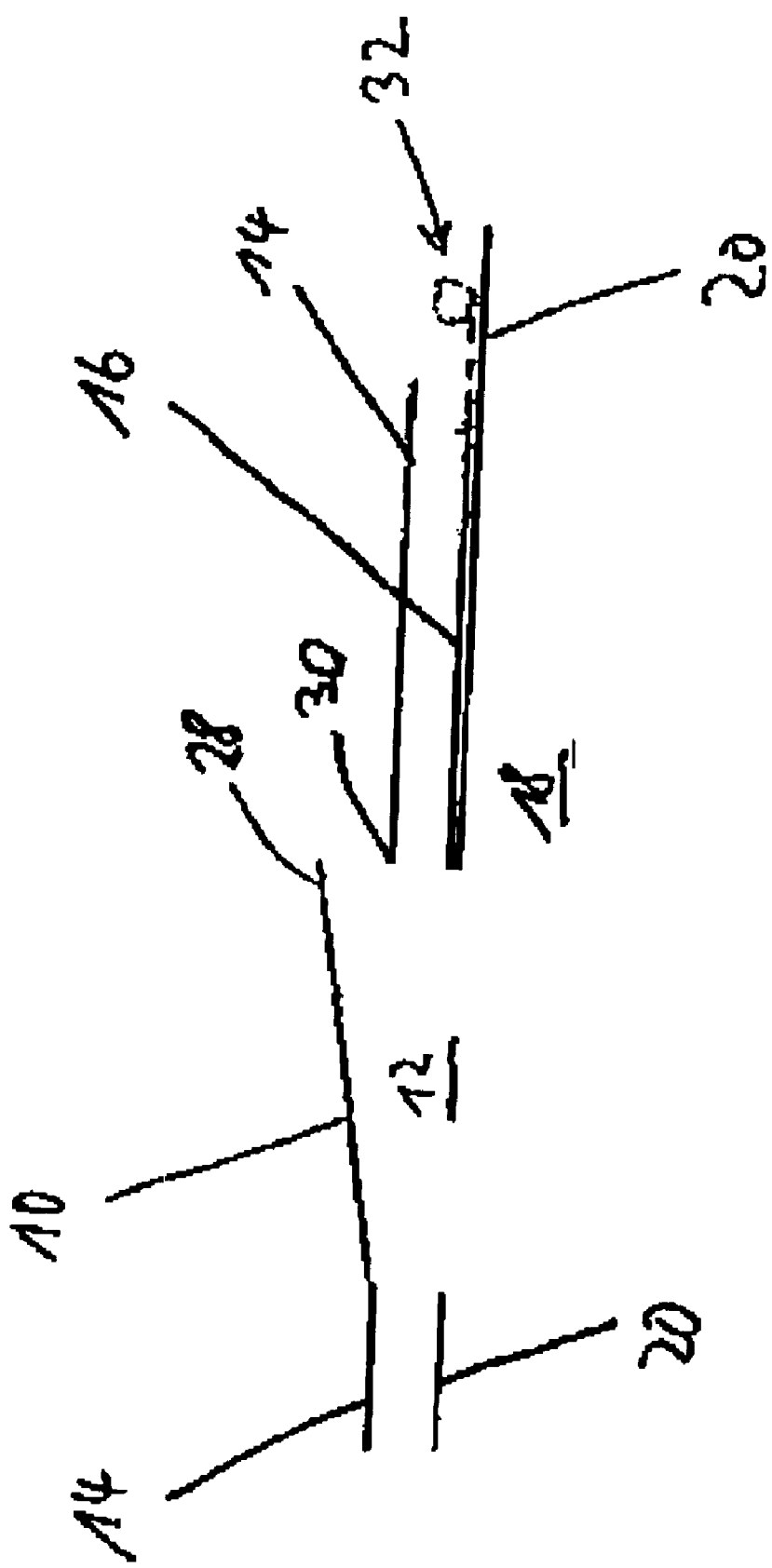
Figure 5:
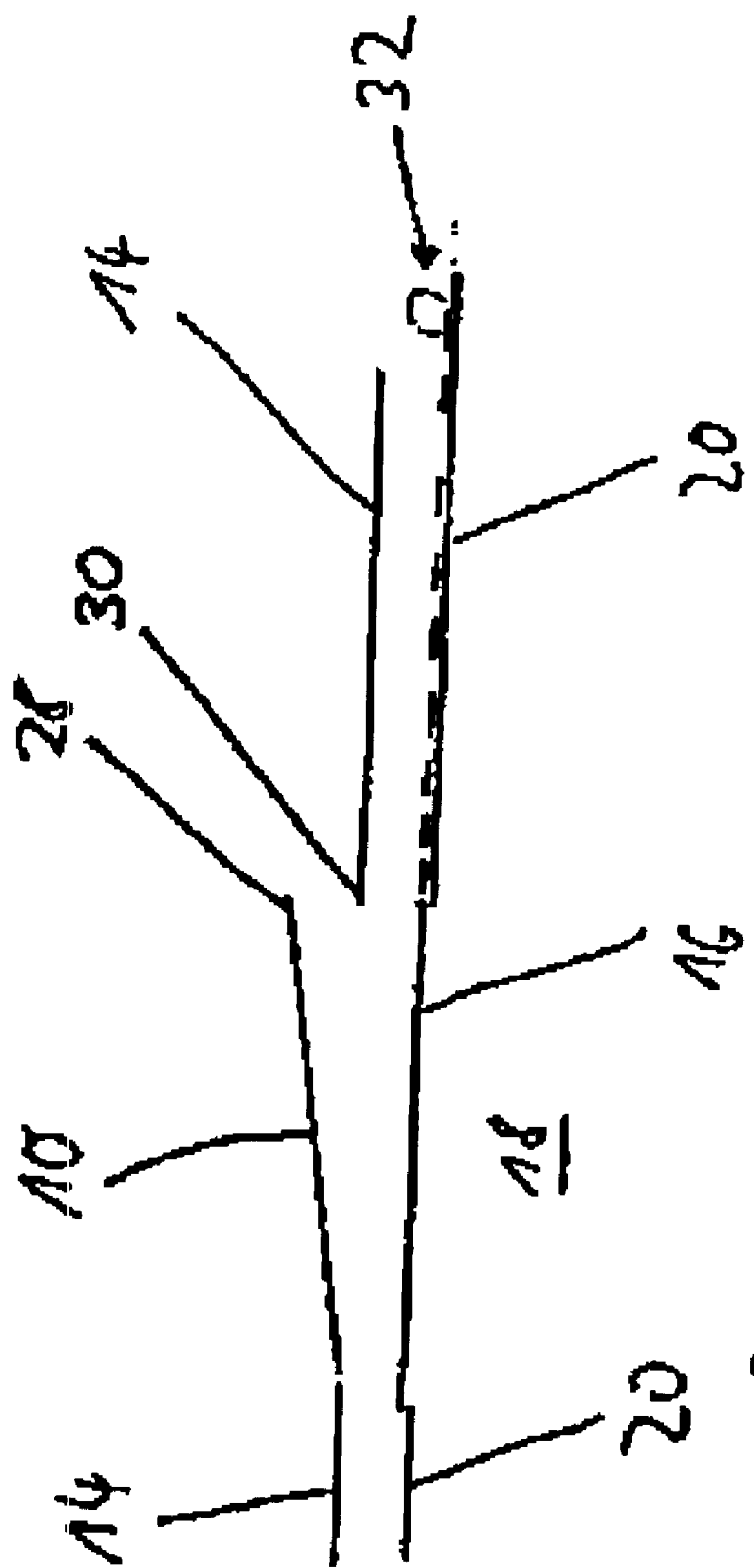

FIG. 4 shows a ventilation position of the cover 10 in which it is pivoted upwardly such that it is raised with its rear edge 28 above the rear edge 30 of the fixed roof skin 14. As shown in FIG. 4, the sliding headliner 16 as shown in FIG. 1 is pushed completely to the rear over the fixed headliner 20 in order to completely clear the roof opening 12. If the cover 10 is to be closed from this position by lowering its rear edge 28, there is the danger that articles or body parts may become pinched in the gap between the rear edge 28 and the rear roof opening edge 30. In order to prevent this from occurring, once the closing of the cover 10 from the ventilation position shown in FIG. 4 is initiated, the drive control of the sliding headliner 16 causes the sliding headliner 16 to move to a position which completely closes the opening 12 (shown in FIG. 5), thereby preventing the ability of articles or body parts from the vehicle interior 18 from being able to travel into the gap between the rear edge 28 of the cover and the rear edge 30 of the roof opening 12. Only after the sliding headliner 16 has reached the position shown in FIG. 5 is control of the drive 32 of the cover 10 initiated to cause the drive 32 of the cover 10 to lower its rear edge 28.

FIG. 6 shows a position in which the cover 10 is completely closed, but the sliding headliner 16 has been moved into a position in which it completely clears the roof opening 12, i.e., completely clears the view to the cover 10 in order to enable unhindered light incidence through the transparent cover 10.

Figure 7:
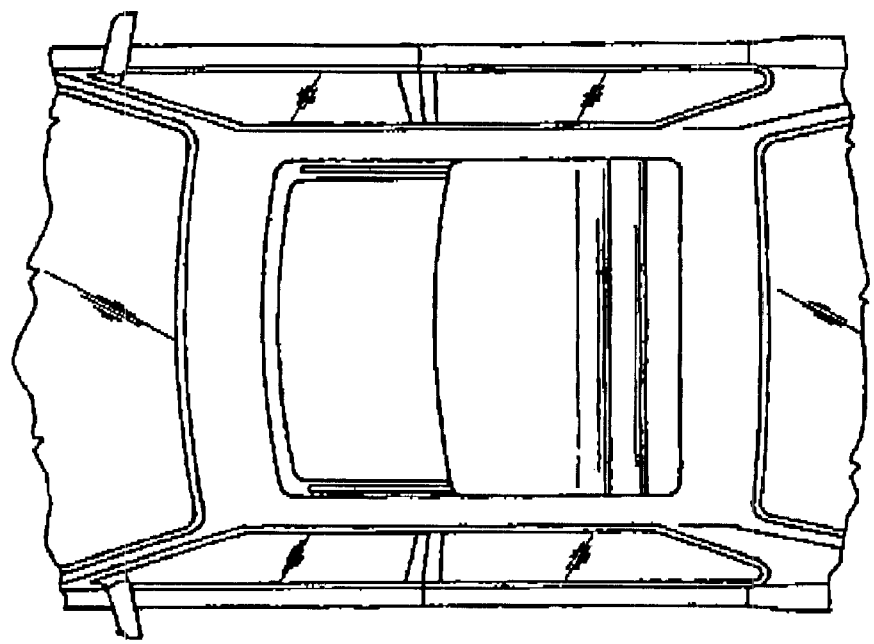
FIGS. 7 and 8 illustrate a folding roof and a louvered roof, respectively.
Figure 8:
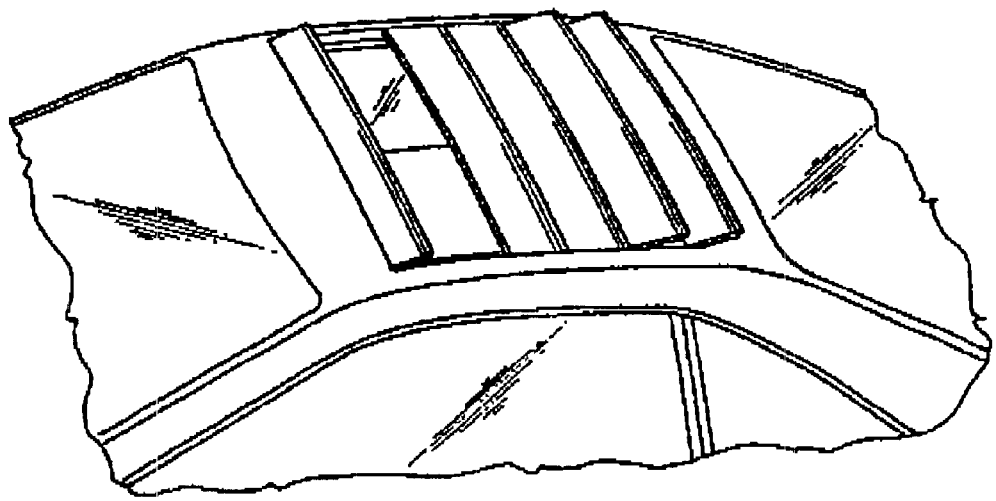

This invention is not limited to the described use with a sliding and lifting roof. Instead, the cover can also be the cover for a sliding roof or a spoiler roof. Furthermore, the sliding headliner controller in accordance with the invention can also be used for a folding roof (FIG. 7) or the fixed mechanism of a folding roof. In addition, the sliding headliner controller can be used as the pinch protection for a louvered roof (FIG. 8), and, in such a case, the sliding headliner is always positioned such that the part or parts which is not covered by the set of louvers to be covered from underneath by the sliding headliner before closing the louvered roof or before movement of the set of louvers. This can be done such that, for each roof closing motion, the sliding headliner leads the roof in the closing direction, the sliding headliner being fully movable with the louvered roof completely closed. However, with the louvered roof completely open, the sliding headliner is closed again so far that the area around the set of louvers is covered. In a louvered roof, both in front of the set of louvers and also behind the set of louvers, an area of the roof opening not covered by the louvers cannot occur. Essentially, it is unnecessary in accordance with the invention for the roof opening to be completely covered, but rather, it is sufficient for the open area of the roof opening to be covered to such an extent that pinching of an article or body part is precluded.

The described approach is especially economical for roof systems with a motorized sunshade or sliding headliner since it requires only the corresponding programming of the control software, but there need be no additional mechanisms, such as sensors.

What is claimed is:

1. An openable motor vehicle roof comprising:
    a closing element adapted for movement into a position that closes or at least partially clears an opening in a fixed roof skin of the motor vehicle;
    a cover element positioned underneath the roof opening, said cover element being adapted for movement into a position that conceals and at least partially clears at least one of said closing element and the roof opening with respect to an interior area of the motor vehicle;
    a drive mechanism for selectively and adjustably moving said closing element,
    a drive mechanism for selectively and adjustably moving the cover element; and
    a controller for controlling the drive mechanisms,
    wherein said controller controls the drive mechanisms such that movement of the closing element into a closed position is not initiated until said cover element is moved at least into a position which covers an area of the roof opening that is exposed by said closing element, thereby preventing entry of objects from the interior area of the motor vehicle into an area of the roof opening that is not covered by said closing element.

2. Motor vehicle roof as claimed in claim 1, wherein said controller includes a sensing mechanism for detecting entry of objects from the interior area of the motor vehicle into the area of the roof opening when said cover element is being moved into the concealing or at least partially clearing position, said sensing mechanism being adapted to send a signal to said controller to stop or reverse movement of said cover element upon detection of said entry.

3. Motor vehicle roof as claimed in claim 2, wherein each drive mechanism is an electrically-operable drive.

4. Motor vehicle roof as claimed in claim 3, wherein each drive mechanism comprises an electric motor and said sensing mechanism is adapted to detect at least on operating parameter of said electric motor.

5. Motor vehicle roof as claimed in claim 4, wherein said sensing mechanism detects at least one of the current and speed of said electric motor.

6. Motor vehicle roof as claimed in claim 5, wherein said controller comprises a digital controller.

7. Motor vehicle roof as claimed in claim 6, wherein said controller is adapted to control said electric motor of the cover element such that said cover element is moved into a position in which the area of the roof opening not covered by said closing element is completely covered by said cover element before said closing element is moved into a position which could lead to pinching of an object between the closing element and an edge of the roof opening.

8. Motor vehicle roof as claimed in claim 7, wherein said cover element comprises a sliding headliner.

9. Motor vehicle roof as claimed in claim 8, wherein said closing element comprises a cover for at least one of a sliding roof, a sliding and lifting roof, and a spoiler roof.

10. Motor vehicle roof as claimed in claim 9, wherein said closing element is transparent.

11. Motor vehicle roof as claimed in claim 7, wherein said closing element comprises a fixed mechanism for a folding roof.

12. Motor vehicle roof as claimed in claim 7, wherein said closing element comprises a set of louvers for a louvered roof.

13. Process for operating an openable motor vehicle roof comprising steps of:
    providing a closing element adapted for movement into positions that close and at least partially clear an opening in a fixed roof skin of the motor vehicle;
    providing a cover element adapted to be positioned underneath the roof opening for movement into a position that conceals or at least partially clears said closing element or the roof opening with respect to an interior area of the motor vehicle;
    providing a drive mechanism for selectively and adjustably moving said closing element;
    providing a drive in mechanism for selectively and adjustably moving the cover element; and
    controlling said drive mechanisms such that movement of the closing element into a closed position is not initiated until said cover element is moved at least to a position which cover an area of the roof opening that is not covered by said closing mechanism, thereby preventing entry of objects from the interior area of the motor vehicle into the area of the roof opening that is not covered by said closing mechanism.

14. Process for operating an openable motor vehicle roof as claimed in claim 13, wherein said controlling step includes detecting entry of objects from the interior area of the motor vehicle into an area of the roof opening when said cover element is being moved into the concealing or at least partially clearing position, and stopping or reversing movement of said cover element upon detection of said entry by said object.

* * * * *